United States Patent [19]

Kisanuki

[11] Patent Number: 4,977,706
[45] Date of Patent: Dec. 18, 1990

[54] WEATHER STRIP

[75] Inventor: Hisayuki Kisanuki, Aichi, Japan

[73] Assignee: Toyoda Gosei Co., Ltd., Nishikasugai, Japan

[21] Appl. No.: 381,983

[22] Filed: Jul. 19, 1989

[30] Foreign Application Priority Data

Jul. 29, 1988 [JP] Japan .................................. 63-191817

[51] Int. Cl.⁵ ............................................. E06B 7/16
[52] U.S. Cl. ....................................... 49/479; 49/441; 49/498; 428/122; 428/188
[58] Field of Search ................. 49/479, 441, 488, 498; 428/122 X, 188 X

[56] References Cited

U.S. PATENT DOCUMENTS

| | | | |
|---|---|---|---|
| 4,616,446 | 10/1986 | Okamoto | 49/441 |
| 4,678,696 | 7/1987 | Maeno et al. | 428/122 |
| 4,704,820 | 11/1987 | Kisanuki | 49/441 |
| 4,756,944 | 7/1988 | Kisanuki | 49/490 |
| 4,769,947 | 9/1988 | Ogawa et al. | 49/479 |
| 4,785,584 | 11/1988 | Kisanuki et al. | 49/441 |
| 4,884,370 | 12/1989 | Nozaki et al. | 49/479 |

Primary Examiner—Philip C. Kannan
Attorney, Agent, or Firm—Cushman, Darby & Cushman

[57] ABSTRACT

A weather strip for sealing a window frame or the like of a vehicle including a straight portion connected to a corner portion having a bent form and a tortuous hollow portion formed in the corner portion is provided. A slit is formed at an opening of the tortuous hollow portion, for example, a circumferential edge of a core drawing the hole for drawing core which form the hollow portion. Consequently, the core drawing hole can be opened easily and the core can be smoothly drawn.

10 Claims, 4 Drawing Sheets

Prior Art

WEATHER STRIP

BACKGROUND OF THE INVENTION

Field of the Invention

The present invention relates to an improved weather strip where in the corner portion is molded.

The weather strip is provided for fixed window glass members such as front and rear windows of a vehicle, a quarter window or the like, door attaching members such as a hood, a door, a sun roof or the like, and slide members such as that between a door and a door glass, so as to protect the vehicle interior from the weather, dust, sound, heat and cold or the like. It also prevents that the air within the vehicle from being drawn to the outside during the high speed motion.

FIG. 1 shows a rear surface of a prior art weather strip arranged in part A of a vehicle 2 shown in FIG. 2. FIG. 3 is a sectional view taken on line III—III in FIG. 1.

The weather strip 1 comprises a corner portion 3, a lateral edge glass run portion 11 corrsponding to lateral edge of a window glass G, and a longitudinal edge glass run portion 21 corresponding to longitudinal edge of the window glass G.

The corner portion 3 is formed by a lateral piece 5 connected to the lateral edge glass run portion 11 and a longitudinal piece 7 connected to the longitudinal glass run portion 21. The lateral piece 5 and the longitudinal piece 7 are connected to each other to form a L-like shape. A hollow portion 9 is formed in the lateral piece 5. The hollow portion 9 continues to a hollow portion 15a of a seal portion 15 of the lateral edge glass run portion 11, and abuts on the lateral edge of the window glass G. In FIG. 3, numeral 6 designates a front wall of the hollow portion 9, numeral 8 designates a rear wall thereof, and numeral 12 designates a side wall thereof. An undercut portion 10 is formed in the left end portion of the front wall 6 due to influence of the longitudinal piece 7. A glass slider 31 is mounted to the longitudinal edge of the window glass G. Consequently, the left end of the hollow portion 9 in the figure seals the upper edge of the glass slider 31. The glass slider 31 includes a slide portion 33 sliding on the longitudinal edge glass run portion 21, and a fixed portion 35 grasping the window glass G.

The lateral edge glass run portion 11 includes a base portion 13, a seal portion 15 and a bent lip 19. The base portion 13 has a L-shaped cross-section and four convex stripe portions are raised therefrom and engaged with a rail portion (not shown) of the vehicle body. The seal portion 15 is constructed by an engaging wall 16 and a seal wall 17 in ring form. The seal wall 17 seal the window glass G. The engaging wall 16 together with the bent lip 19 grasps the window glass G so as to position the window glass G with respect to the seal wall 17.

The longitudinal edge glass run portion 21 includes a base portion 23 with a U-like cross-section, and a pair of seal lip portions 25, 27. Four convex stripe portions 24 are raised from the base portion 23 and engaged with a rail portion (not shown) of the vehicle body. The seal lip portions 25, 27 seal both side surfaces of the glass slider 31.

The weather strip 1 is formed such that each of the glass run portions 11, 21 is molded by extrusion, and the corner portion 3 is then molded (injection molding, transfer molding or the like) and the three members are connected. Since the hollow portion 9 exists in the corner portion 3, a core is used. Numeral 4 in FIG. 3 designates a core drawing hole.

In the above described weather strip 1, however, the undercut portion 10 is formed at the left end of the front wall 6 of the lateral piece 5 because of longitudinal piece 7. Thus when the corner portion 3 is molded, the front wall 10 becomes an undercut for the core. That is, the core drawing direction (shown by the arrow in FIG. 3) is shifted from the extension of the axial line of the core (shown by dash-and-dot line in FIG. 3). Also the drawing hole 4 is smaller than the hollow portion 9 because of undercut portion 10. Consequently, the circumferential edge of drawing hole 4 interferes with the core and drawing the core becomes difficult. When the core is drawn with force, crack may occur in the circumferential edge of the drawing hole 4. The weather strip having such a crack will be an inferior article. Inferior articles raise the manufacturing costs of the weather strip.

SUMMARY OF THE INVENTION

An object of the invention is to provide a weather strip wherein the corner portion connecting the longitudinal piece and the lateral piece is formed so that even when the hollow portion is tortuous and, for example the core drawing direction defining the inner surface of the hollow portion is shifted from the extension of the axial line of the core itself, the core can be drawn smoothly. Since the core can be drawn smoothly, crack rarely occur in a portion where the hollow portion is opened on the surface of the weather strip, i.e., in the circumferential edge of the core drawing hole. Accordingly, the yield of the products is imporved and the manufacturing costs of the weather strip are reduced.

In order to attain the foregoing object, in the weather strip of the invention, a slit is preformed on a circumferential edge portion of a core drawing hole so that the core drawing hole can be easily widened.

Another object of the invention is to provide a weather strip wherein in addition to the tortuous hollow portion (first hollow portion), a second hollow portion is provided in the lateral piece and/or the longitudinal piece, and the core defining the inner surface of each hollow portion can be drawn smoothly from the lateral piece or the longitudinal piece.

In order to attain the foregoing object, in the weather strip of the invention, the core drawing hole of the second hollow portion is provided at the top end side with respect to the tortuous portion of the first hollow portion.

DESCRIPTION OF THE PREFERRED EMBODIMENTS

The invention will now be described further in detail by way of embodiments.

First Embodiment

Figure 1:
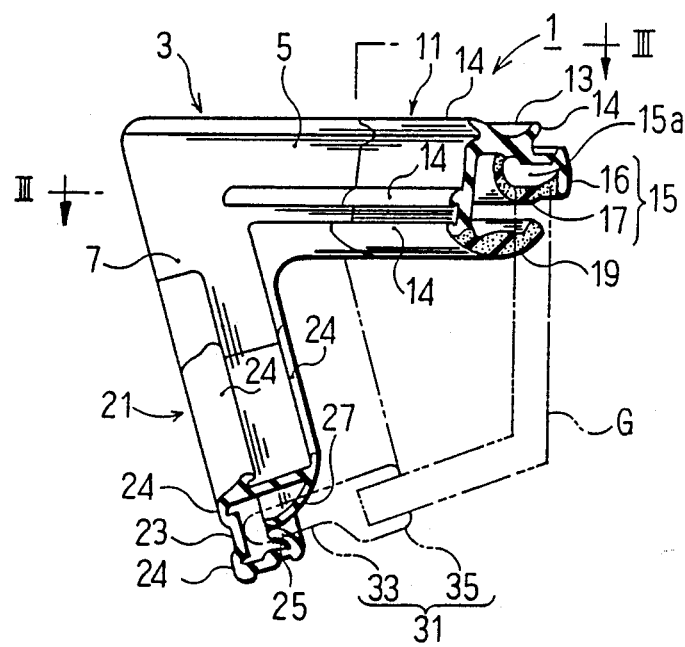
FIG. 1 is a rear elevation of a prior art weather strip.
Figure 2:
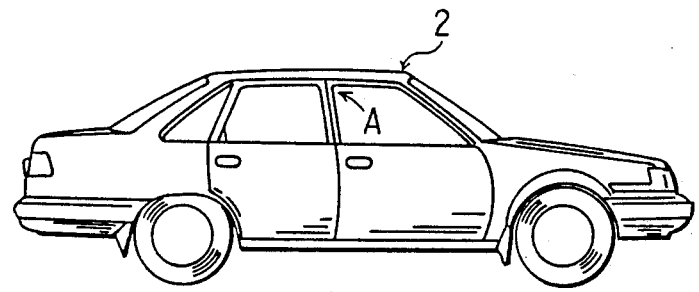
FIG. 2 is a side view of a vehicle.
Figure 3:
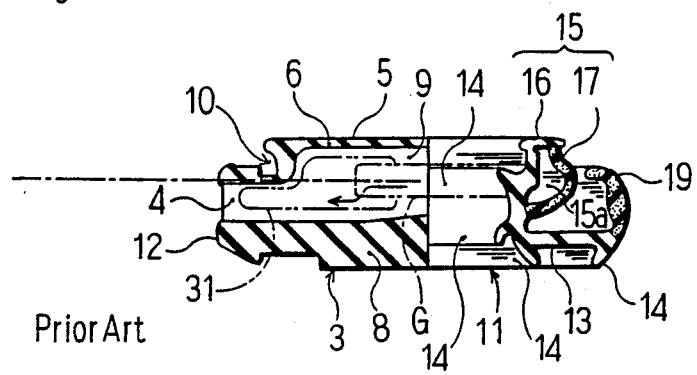
FIG. 3 is a sectional view taken on line III—III in FIG. 1.
Figure 4:
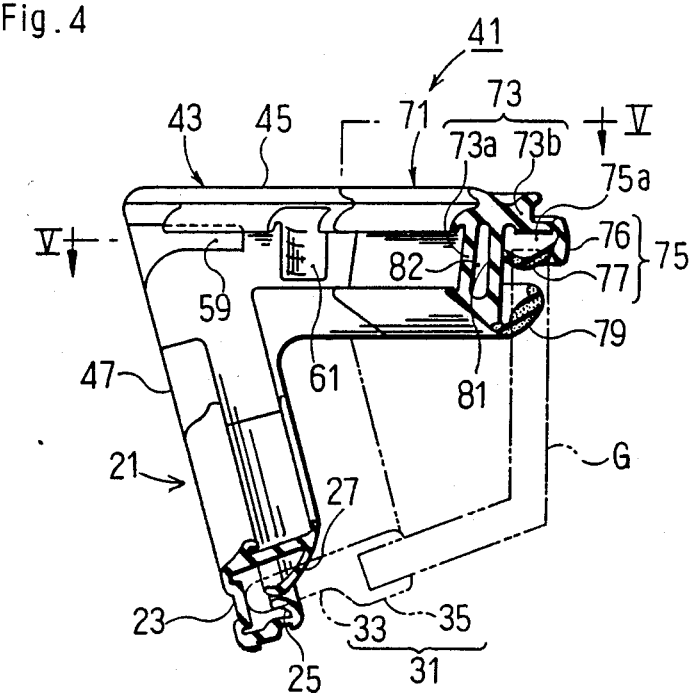
FIG. 4 is a rear elevation of a weather strip in accordance with a first embodiment of the invention.
Figure 5:
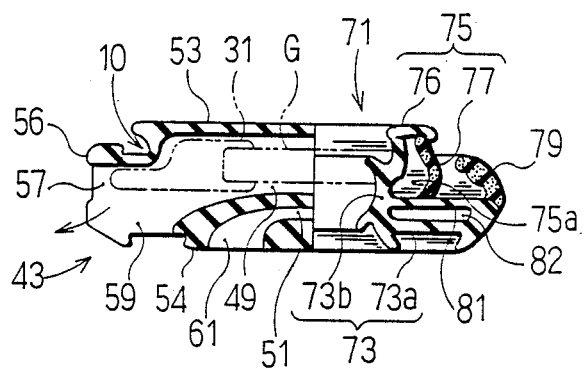
FIG. 5 is a sectional view taken on line V—V in FIG. 4.

FIG. 4 shows a rear surface of a weather strip 41 of a first embodiment, and FIG. 5 shows a sectional view taken on line V—V in FIG. 4. The same parts as those in the prior art are designated by the same reference numerals, and the description shall be partially omitted. The weather strip 41 is constructed by a corner portion 43, a lateral edge glass run portion 71 and a longitudinal edge glass run portion 21.

The corner portion 43 is constructed by a lateral piece 45 continuing to the lateral edge glass run portion 71 and a longitudinal piece 47 continuing to the longitudinal edge glass run priton 21, both pieces being connected to form a L-like shape. The longitudinal piece 47 has the same construction as that of the prior art. The lateral piece 45 is provided with a first hollow portion 49 continuous with a space 75a of a seal portion 75 of the lateral edge glass run portion 71, and with a second hollow portion 51 continuous with a space 82 formed by a wall 73a of a base portion 73 and a reinforcing wall 81 parallel thereto. Numeral 53 in the figure designates a front wall, numeral 54 designates a rear wall, and numeral 56 designates a side wall. A core drawing hole 57 for the first hollow portion 49 is formed in the side wall 56.

This embodiment is characterized in that a slit 59 is formed from the core drawing hole 57 defining the first hollow portion 49 to the rear wall 54. Since the slit 59 exists, the drawing hole 57 can be easily widened when the core is drawn. Consequently, the core can be smoothly drawn and cracks rarely occur in the circumferential edge of the opening portion 57.

Core drawing hole 61 of the second hollow portion 51 is formed in the rear wall 54 at the front end side with respect to the meandering portion of the first hollow portion 49 in the lateral piece 45. The core drawing hollow 61 has a diameter larger than that of the inner circumference of the second hollow portion 51 so that drawing the core defining the second hollow portion 51 is easy.

The lateral edge glass run portion 71 is provided with a base portion 73, a seal portion 75, a bent lip 79 and a reinforcing wall 81. The base portion 73 is constructed by a wall 73a arranged in parallel to the window glass G and a vertical wall 73b arranged perpendicular to the window glass G, both walls being connected in L-shaped cross-section. The seal portion 75 includes an engaging wall 76 and a seal wall 77. The seal wall 75 seals the lateral edge of the window glass G and the upper edge of the glass slider 31. The engaging wall 75 together with the bent lip 79 grasps the window glass G so as to position the window glass G against the seal wall 77. The reinforcing wall 81 prevents the parallel wall 73a of the base portion 73 from falling down to the side of the vertical wall 73b, and secures the mounting stability of the base portion 73 to a rail portion (not shown) of the vehicle body.

The above described weather strip 41 is manufactured as follows. First, the lateral edge glass run portion 71 and the longitudinal edge glass run portion 21 are molded by extrusion. In the lateral edge glass run portion 71, the seal wall 77 and the bent lip 79 are made of formed EPDM. The remaining portions (including the longitudinal edge glass run portion 21) is made of solid EPDM. Then, both glass run portions 71, 21 are used as an insert and the corner portion 43 is formed by molding (injection molding, transfer molding or the like). Then the three members are cured and bonded. The corner portion 43 is formed entirely from solid EPDM. Of course, the molding material of the weather strip is not limited to the EPDM, as above described but can be made from any suitable material.

When the corner portion 43 is molded in this manner, the core of the second hollow portion 51 is first drawn. Since the core drawing hole 61 of the second hollow portion 51 is formed at the top end side with respect to the tortuous portion of the first hollow portion 49, i.e., at the side of the lateral edge glass run portion 71 and made larger than the second hollow portion 51, the core defining the second hollow portion 51 can be easily drawn.

In the lateral piece 45, if the core drawing hole 61 is provided at the origin side (the left side in the figure) with respect to the tortuous portion of the first hollow portion 49, since the circumferential wall of the tortuous portion of the first hollow portion 49 will interfere, the drawing of the core of the second hollow portion 51 is difficult.

Next, the core of the first hollow portion 49 is drawn. In this case, since the slit 59 is formed from the circumferential edge of the core drawing hole 57 to the rear wall 54, the drawing hole 57 is opened with a small load so that drawing the core can be easily accomplished.

Although in the foregoing description the lateral edge glass run portion 71 had the reinforcing wall 81, of course, the slit 59 may be provided in the rear wall even using the lateral edge glass run portion 11 as described with reference to the prior art.

Figure 6:
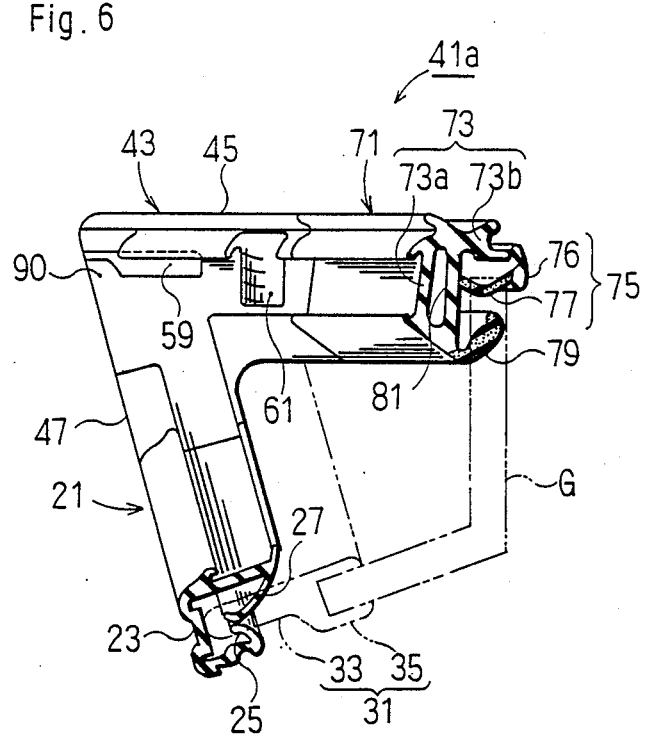
FIG. 6 is a rear elevation of a modified weather strip.

The opening width of the slit 59 is suitably designed in consideration of "rigidity" of the forming material of the corner portion 43. When the opening width of the slit is large, from the viewpoint of maintaining the shape holding property of the corner portion 43, as in the weather strip 41a shown in FIG. 6, it is preferably that a projection 90 extends from the lower edge of the slit 59 and the width of the portion continuing to the core drawing hole 57 be narrow. The projection may be provided at the upper edge of the slit 59 or at both the lower edge and the upper edge of the slit 59.

In the corner portion 43 of the first embodiment, the second hollow portion 51 need not be provided.

Second Embodiment

A weather strip 100 in accordance with another embodiment of the invention includes a corner portion 101, a lateral edge straight portion 116 and a longitudinal edge straight portion 120, and seals a portion between a door and a body of the vehicle.

The corner portion 101 includes a lateral piece 103 continuous with the lateral edge straight portion 116 and a longitudinal piece 105 continuous with the longitudinal edge straight portion 120, both pieces being connected in L-like shape.

Figure 9:
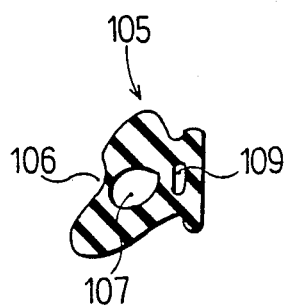
FIG. 9 is a sectional view taken on line IX—IX in FIG. 7.

The longitudinal edge straight portion 120 comprises a base portion 121 and two hollow seal portions 123, 125 provided on the base portion 121, and a grooved portion 127 formed between the two hollow portions 123, 125. One lateral edge straight portion 116 is also provided with a base portion 117 and a hollow seal portion 118, but does not include a grooved portion as in the longitudinal edge straight portion 120. Consequently, in the corner portion 101 connecting the longitudinal and lateral straight portions 116, 120, grooved portion 106 gradually shallows in the longitudinal edge 105 (refer to FIG. 9).

A first hollow portion 107 continuous with the first hollow seal portion 123 of the longitudinal edge straight portion 120, a second hollow portion 108 continuous with the second hollow seal portion 125, and a third hollow portion 109 continuing to the hollow portion 122 of the base portion 121 are formed in longitudinal edge 105. A core drawing hole 111 is bored at a portion intersecting the lateral edge 103. At the circumferential edge of the core drawing hole 111, a slit 113 is formed in each axial direction of the lateral edge 103 and the longitudinal edge 105. Each slit 113 is widened in circular form at the top end so that the core drawing hole 111 can be widened more easily during core drawing.

Figure 7:
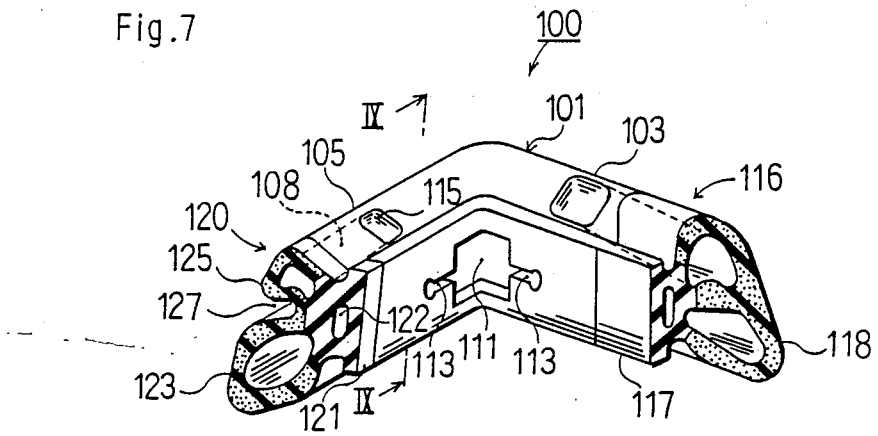
FIG. 7 is a perspective view of a second embodiment of the weather strip.
Figure 8:
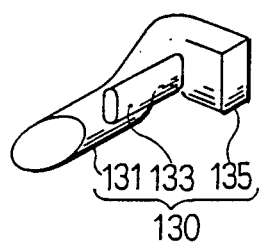
FIG. 8 is a perspective view of a core of a longitudinal piece.

FIG. 8 shows a core 130 for the longitudinal edge 105. The core 130 is constructed by a portion 130 defining the first hollow portion 107, a portion 133 defining the third hollow portion 109 and a base portion 135. The portion 131 defining the first hollow portion 107 is tortuous as shown in the figure. This is because the hollow seal portion of the corner portion 101 is offset so as to connect the first hollow seal portion 123 of the longitudinal edge straight portion 120 and the hollow seal portion 118 of the lateral edge straight portion 116. A core (not shown) defining the second hollow portion 108 is separate from the core 130, and is drawn from the core drawing hole 115 formed on the upper surface of the corner portion 101 as shown in FIG. 7. The position of the core drawing hole 115 is at the top end side with respect to the tortuous portion of the first hollow portion 107.

A core similar to that used in the longitudinal edge 105 is also used in the lateral edge 103 of the corner portion 101.

To form the above-described weather strip 100 the lateral edge straight portion 116 and the longitudinal straight portion 120 are respectively molded in extrusion, and then the corner portion 101 is molded and the three members are cured and bonded. During the which define of the corner portion 101, the portion 131 molding the first hollow portion of the core 130 is offset and is substantially perpendicular to the direction of drawing the core 130. Consequently, resistance exists when the core 130 is drawn from the core drawing hole 111.

In the embodiment, however, since the slit 113 is formed in the circumferential edge of the core drawing hollow 111, the core drawing hole 111 is easily widened. Consequently, the core 130 can be drawn smoothly. Also since the core drawing hole 115 is at the top end side with respect to the tortuous portion of the first hollow portion 107, the core defining the second hollow portion 108 can be drawn smoothly.

Of course, the invention is not limited to the weather strip of the embodiments specifically disclosed herein, but can be applied to any type of the weather strip where the corner portion is molded and a hollow portion is in the longitudinal piece and/or the lateral piece.

What is claimed is:

1. A weather strip for vehicles, comprising:
   (a) a straight portion;
   (b) a corner portion having a bent shape and connected to said straight portion, said corner portion including a lateral piece connected to a longitudinal piece, a tortuous hollow portion being formed in at least one of said lateral piece and said longitudinal piece;
   means defining a core drawing hole in a surface of said corner portion for drawing a core which forms said hollow portion, and
   means defining a slit at a predetermined location on a circumferential edge of said core drawing hole, whereby the core drawing hole can be easily widened when said core is drawn.

2. A weather strip as set forth in claim 1, wherein said core drawing hole is defined at an extension of said hollow portion, and said hollow portion includes an undercut portion at the connection between said longitudinal piece and said lateral piece, and said slit is formed on a wall facing said undercut portion.

3. A weather strip for vehicles, comprising:
   (a) a straight portion;
   (b) a corner portion having a bent form and connected to said straight portion, said corner portion including a lateral piece connected to a longitudinal piece, tortuous hollow portions being formed in said lateral piece and said longitudinal piece, respectively;
   means defining a core drawing hole in a surface of said corner portion for drawing a core which forms said hollow portions, and
   means defining a slit at a predetermined location on a circumferential edge of said core drawing hole, whereby the core drawing hole can be easily widened when said core is drawn.

4. A weather strip as set forth in claim 3, wherein a distal end of said slit, spaced from said circumferential edge, is of circular form.

5. A weather strip as set forth in claim 3, wherein said core drawing hole opens facing a direction substantially perpendicular to an extension of said hollow portion, and said slit is formed from the circumferential edge of said core drawing hole in a direction substantially parallel to said hollow portion.

6. A weather strip as set forth in claim 1 or 3, wherein said lateral piece and said longitudinal piece are connected a L-like shape.

7. A weather strip as set forth in claim 1 or claim 3, wherein said slit is narrow at the circumferential edge of said core drawing hole and is wide at a distal end thereof.

8. A weather strip for vehicles, comprising:
   (a) a straight portion;
   (b) a corner portion having a bent form and connected to said straight portion, said corner portion including a lateral piece connected to a longitudinal piece, a first winding hollow portion formed in at least one of said lateral piece and said longitudinal piece and a second hollow portion defined substantially parallel to the first hollow portion;
   means defining a first core drawing hole in a surface of said corner portion for drawing a core which forms said first hollow portion, means defining a slit at a predetermined location on a circumferential edge of said first core drawing hole, whereby said first core drawing hole can be widened when said core is drawn, and
   means defining a second core drawing hole for drawing a core which forms said second hollow portion, said second core drawing hole being formed on a surface of said corner portion at a side of said straight portion with respect to the winding portion of said first hollow portion.

9. A weather strip as set forth in claim 8, wherein said second core drawing hole is wider than said second hollow portion.

10. A weather strip for vehicles, comprising:
(a) a straight portion;
(b) a corner portion having bent form and connected to said straight portion, said corner portion including a lateral piece and a longitudinal piece, a first winding hollow portion formed in said lateral piece and in said longitudinal piece and a second hollow portion defined substantially parallel to said first hollow portion;

means defining a first core drawing hole in a surface of said corner portion for drawing a core which forms said first hollow portion, means defining a slit at a predetermined location on a circumferential edge of said first core drawing hole, whereby said first core drawing hole can be widened when said core is drawn, and means defining a second core drawing hole for drawing a core which forms said second hollow portion, said second core drawing hole being formed on a surface of said corner portion at a side of said straight portion with respect to the winding portion of said first hollow portion.

* * * * *